July 4, 1939.  R. MANN  2,164,333
HOPPER AND SEED DISTRIBUTING MECHANISM FOR SEED PLANTERS
Filed March 15, 1937  5 Sheets-Sheet 1
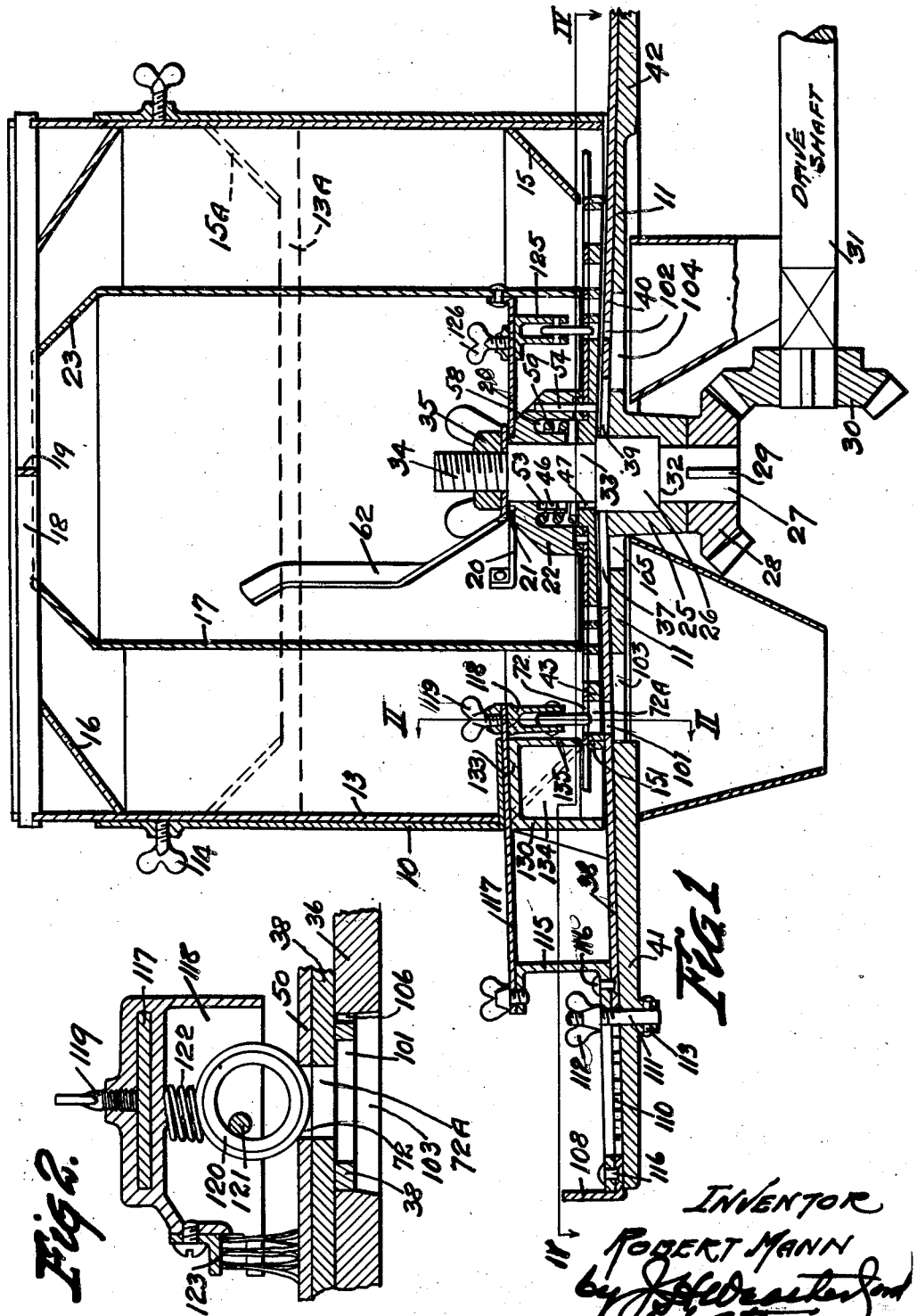

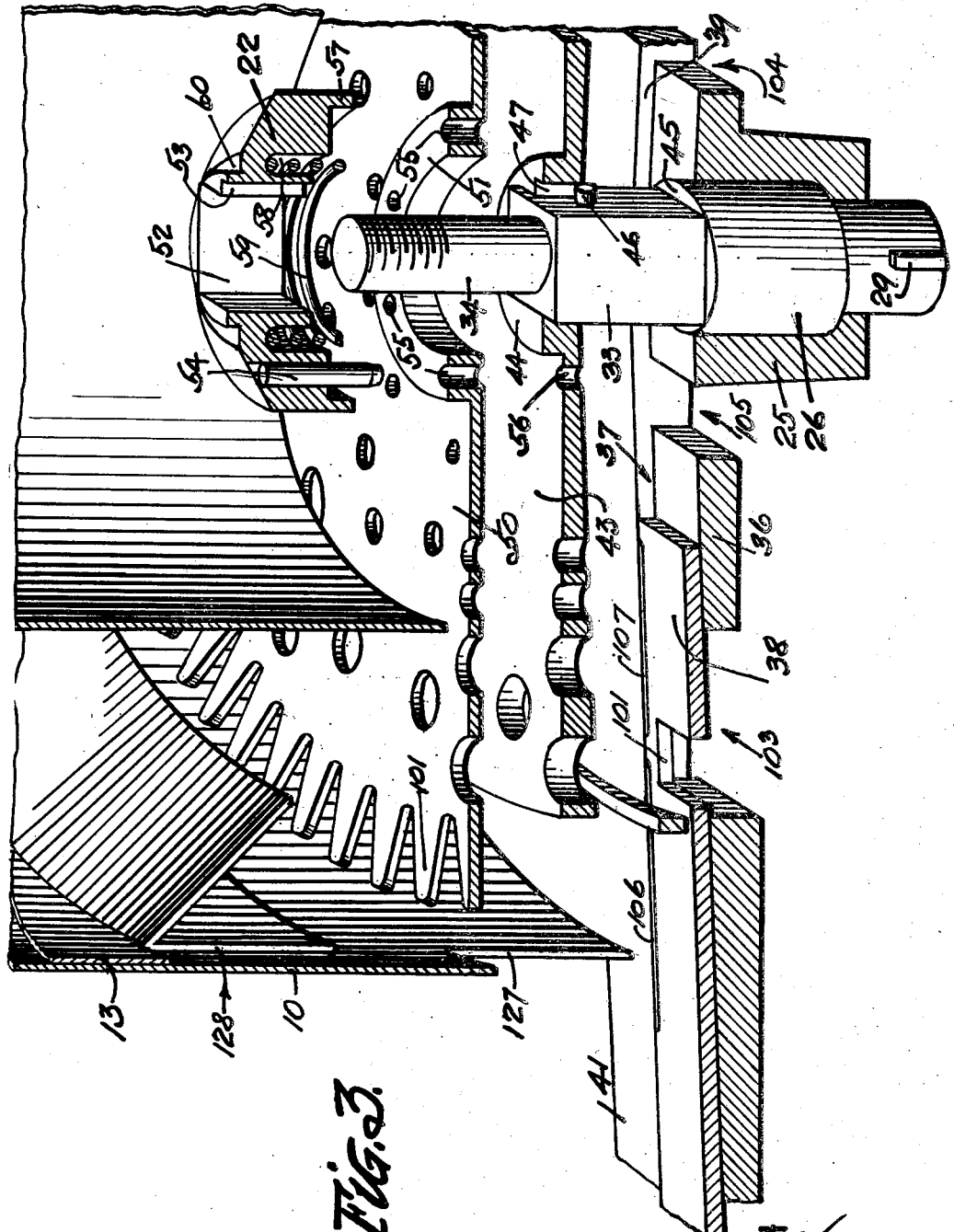

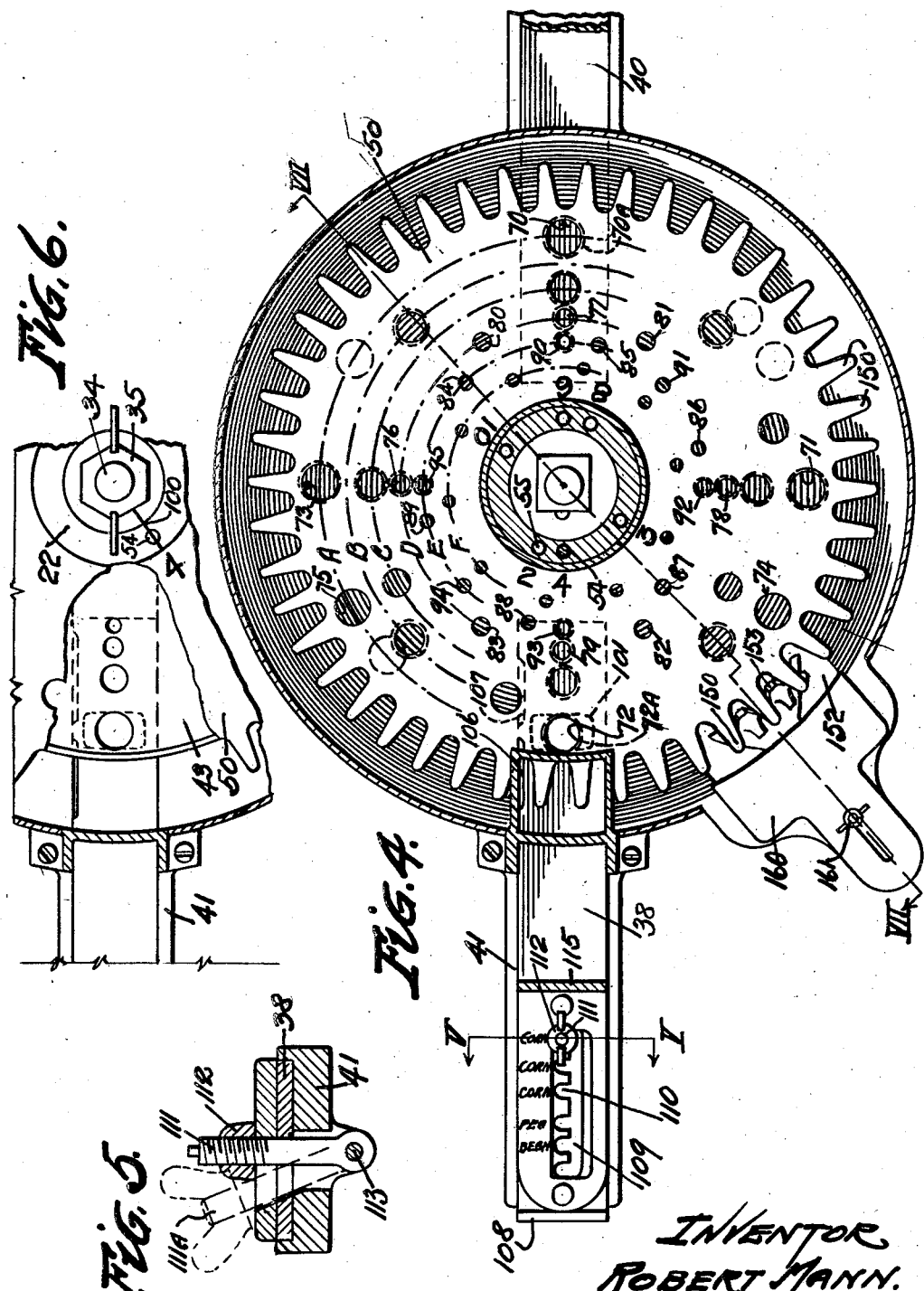

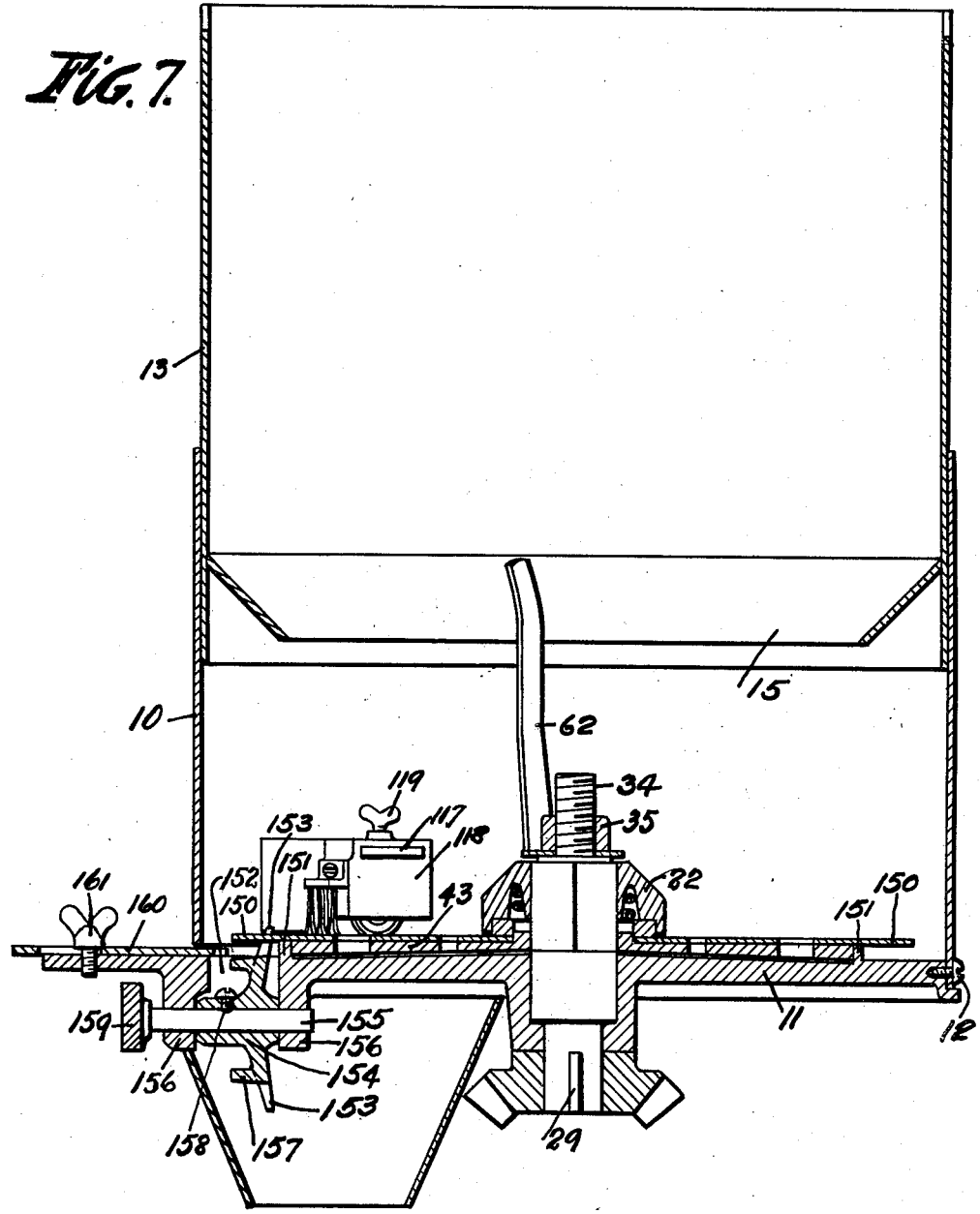

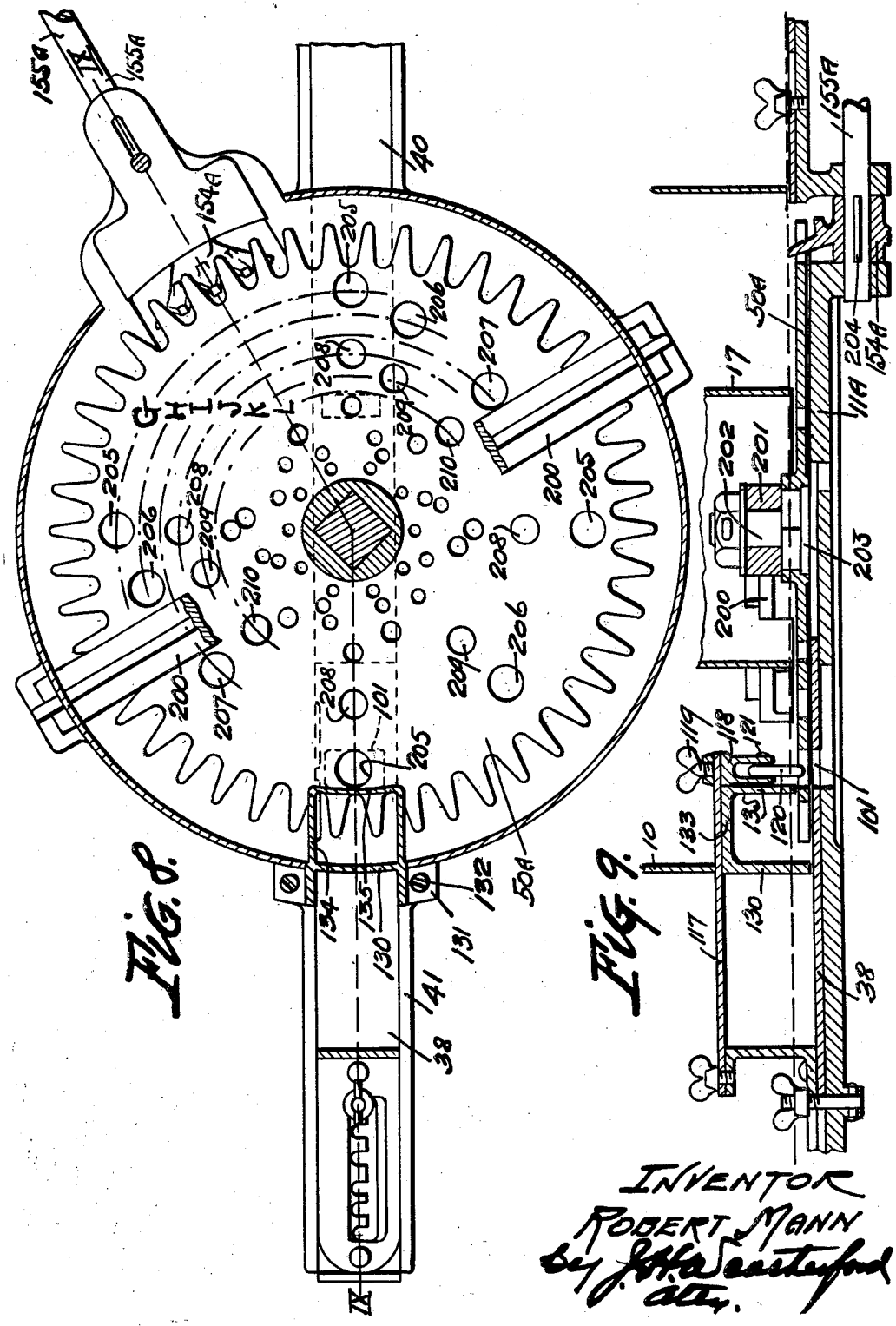

Patented July 4, 1939

2,164,333

UNITED STATES PATENT OFFICE 2,164,333

HOPPER AND SEED DISTRIBUTING MECHANISM FOR SEED PLANTERS

Robert Mann, Memphis, Tenn.

Application March 15, 1937, Serial No. 130,910

20 Claims. (Cl. 221—141)

This invention relates to a mechanism for holding and dropping seeds such as cotton, corn, peas or the like, for use in connection with a seed planter, and has especial reference to such a mechanism in which there is provided a seed hopper and in connection therewith, means for selecting any one of a number of sizes of seed, and means in connection with such selector for varying the spacing of each of such sizes, whereby the necessity of having a removable plate for each such size and spacing is avoided.

In seed planters, hoppers are used for holding the seed, and seed are selectively dropped from such hoppers for planting. One planter will be used for seeds of quite a number of sizes and in certain sections of the country for seeds of quite dissimilar character, one of the common types being used for planting cotton, a seed covered with lint and requiring special dropping mechanism, and for corn, peas, soy beans, and other smaller grains, such as sorghum or the like. Not only are the seeds to be planted of different size, but also different numbers of seed of any one kind are planted under different conditions, provision ordinarily being made for three spacings of corn and for two spacings of other sizes of seed. To meet the conditions thus set up, it is usually customary to use in the bottom of the hopper which holds the seed, a removable rotary plate each having a desired number of holes therein of a size suitable for the seed to be planted, and to the distribution of seeds wanted. For each size seed and for each distribution of such seed, a different plate is used. For example, for corn, three plates are ordinarily furnished, one of these plates having two holes, a second plate having three holes, and a third plate having four holes, and respectively dropping two, three and four seeds per revolution. Also for peas there are ordinarily two plates. Also in some instances three sets of plates are used for each of two or three sizes of corn so that the ordinary planter has from ten to fifteen removable plates which must be changed with each change in spacing or in size of grain.

The objects of the present invention are:

In a distributor for a seed planter:

To provide a seed hopper having self-contained means selectively usable for distributing any one of a plurality of sizes of seed at any one of a plurality of spacings.

To provide adjustable self-contained means for varying the spacing and selecting the size of the holes through which seed are to be dropped.

To provide adjustable means for selectively varying the spacing and adjustable means for selectively uncovering desired sizes of holes through which seed are dropped.

To provide a series of concentric seed races, means for selectively varying the usable openings in said races and means for selectively uncovering a said race for use.

To provide in a seed hopper self contained means for adjusting the spacing and means for selectively determining the size and of the openings through which seed are to be dropped.

To provide in a seed hopper, means for separating the hopper into two parts and self contained means, selectively and independently adjustable, for selectively determining the size and spacing of the openings through which seed are to be dropped from each thereof.

The means by which the foregoing and other objects are accomplished and the manner of their accomplishment will readily be understood from the following description on reference to the accompanying drawings, in which, Fig. 1 is a sectional elevation showing a seed planter hopper and distributor therefor which is adapted selectively to plant cotton or a desired other seed at desired selective spacings, and which is also adapted to alternate two such other seeds.

Fig. 2 is a fragmentary section taken on the line II—II of Fig. 1, showing a detail of a knocker and wiper.

Fig. 3 is an enlarged isometric projection taken on the same section as Fig. 1, with parts separated to illustrate details of construction.

Fig. 4 is a sectional plan taken on the line IV—IV of Fig. 1.

Fig. 5 is a fragmentary section taken on the line V—V of Fig. 4.

Fig. 6 is a fragmentary sectional plan with a portion of certain parts broken away to more clearly show the underlying parts.

Fig. 7 is a sectional elevation taken on the line VII—VII of Fig. 4, showing the hopper set for use as a cotton planter.

Fig. 8 is a sectional plan corresponding to Fig. 4 and showing a modification of the device; and Fig. 9 a fragmentary sectional elevation taken on the line IX—IX of Fig. 8.

Referring now to the drawings in which the various parts are referred to by numerals, 10 is a hopper preferably cylindrical, the lower edge of which rests on a base 11, and is secured to such base as by screws 12 (Fig. 7). Within the hopper 10 is a sleeve 13 which ordinarily rests directly on the base 11, but which may be raised thereabove as to the dotted position 13A and supported as by set screws 14, this raised position also being shown in Fig. 7.

Adjacent the lower edge of the sleeve 13 is an inwardly projecting annular flange 15, which as will be later pointed out, is adapted to overlie an annular portion of the base 11 adjacent the inside of the wall of the hopper 10, this flange preferably inclining downwardly as well as extending inwardly from the sleeve wall. An additional flange 16 may also be provided at the upper end of the sleeve 13, this flange extending inward a somewhat greater distance than the flange 15, and being adapted to cover a wider annular portion of the base. The sleeve 13 is not only slidably adjustable within the hopper 10, but may be entirely removed therefrom and inverted, in which position the flange 16 becomes available.

Optionally there may be disposed within the hopper and sleeve an inner hopper or holder 17, this holder preferably being carried by cross arms 18, 19 preferably resting on and supported by the sleeve 13, but which may by extending the height of the hopper 10, be supported thereby. Preferably the arms 18, 19 are notched where they rest on the sleeve, to prevent lateral displacement, and the edges of the sleeve are notched to prevent turning movement. The lower portion of the holder 17 may be centered by arms 20 which extend radially inward from the holder walls and which are secured at their inner ends to a ring 21 which loosely surrounds a locking collar 22 hereinafter to be described. The holder 17 may be provided at its upper end with an upwardly and inwardly extending flange 23, for the purpose of providing a larger annular opening between it and the flange 16, whereby filling of the annular space between the holder 17 and the sleeve 13 is facilitated.

It will here be understood that the holder 17 would in many cases not be used, and would only be provided in cases where it was desired to alternate dissimilar seeds in planting; in which case the provision of the holder would allow one class of seeds to be carried in the annular space exterior to and a second class of seeds in the interior of such holder.

The base 11 has a downwardly projecting hub 25 in which is journaled a shaft 26, this shaft having a lower end 27 preferably of reduced diameter to which a driving pinion 28 is secured as by a key 29. 30 is a bevel pinion meshing with the pinion 28, this latter pinion being mounted on a shaft 31 which is driven by external means not here shown, but which is common in seed planter construction, it being understood that this driving means is old and is illustrative only. The reduced lower portion 27 forms with the shaft 26 an annular collar 32 which collar rests on a complementary interior collar in the hub 25 and supports the shaft during rotation. Immediately above the top surface of the base the shaft 26 is again reduced in diameter, such reduced section 33 preferably being square. Above this squared portion the shaft 26 is again reduced in diameter and provided with a threaded portion 34 which is adapted to receive a nut 35, preferably a wing nut. The upper surface 36 of the base is smooth, but is preferably slightly coned, to permit corresponding coning of a disk to be later described, and is provided with a shallow radial groove 37, in which is disposed a movable slide 38, the top of this slide being flush with the top of the base. In many instances, and particularly where it is desired to alternate seed of two kinds, a second similar groove 39 is provided in the diametrically opposite side of the base and in this groove a second slide 40 is disposed, this slide likewise having its upper surface flush with the upper surface of the base. 41 and 42 are respectively outward extensions from the base in which the grooves 37 and 39 are continued, these extensions forming supports for the outer ends of the slides.

Disposed immediately above the base, and carried and turned by the shaft 26, is a disk 43 which has a cylindrical hub 44 projecting upwardly therefrom, the under surface of this disk being coned to conform to the coning of the base, whereas the upper surface of the disk is preferably level, this coning of one surface of the disk providing a disk of increasing thickness from the center towards the periphery. It will be understood however, that in many cases such coning of base and disk is not used. The disk 43 rests on the shoulder 45 formed at the junction of the squared portion 33 of the shaft with the circular portion therebelow and is preferably carried by the shaft out of contact with the underlying base, so that frictional contact between the disk and the base during rotation is avoided. 46 is a lug projecting from one of the faces of the squared portion 33 of the shaft, 47 a cooperating groove in the hub 44 of the disk which requires assembling of the disk on the shaft in a particular position. 50 is a plate adapted to overlie the disk 43 and rest on the surface thereof. This plate has a hub 51 which is bored to conform to the exterior of the hub 44 and may be relatively turned to such position of adjustment, relative to the disk 43, as may be desired. The collar 22 is adapted to contact the hub 51 of the plate 50 and clamp the plate 50 and disk 43 on the shaft, being held in place by the nut 35. The collar 22 has a square hole 52 which fits the squared portion 33 of the shaft. This collar likewise has a groove 53 adapted to cooperate with the lug 46 in positioning the collar on the shaft. Secured in the collar and depending therebelow, is a lock pin 54; the hub 51 of plate 50 has therethrough a plurality of concentric lock holes 55 each adapted to permit the passage of this pin, and the disk 43 has a hole 56 to receive the lock pin. In the instant case there are six of these lock holes, which are preferably arranged in two opposite groups of three each, the center holes of the two groups being preferably diametrically opposite and marked on the plate 50 with the numbers 4 and 6 respectively. At one side of the hole marked "4" and preferably exactly thirty or sixty degrees therefrom is a hole marked "3" on the plate and at one side of the hole 6 a hole marked "10", which however may be spaced at random. On the opposite side of the hole 4 and preferably fifteen degrees therefrom, is a hole marked "2" and preferably at twenty-two and one-half degrees from the hole 6, a hole marked "8". The pin 54 is in permanent alignment with the hole 56 in the disk, it being impossible by reason of the lug 46 and the grooves 47 and 53, to assemble the disk and collar on the squared shaft in other than a position in which such alignment of the pin and hole will occur. When the collar 22 and this pin are raised free from the plate 50 the plate is shiftable with reference to the disk 43 and may be turned to align any one of the holes 55 with the hole 56. When aligned the collar 22 is lowered to place, the pin 54 passing through the aligned hole 55, and into the hole 56 locking the plate and disk together. The collar 22 may have a depending flange 57 adapted to embrace the exterior of the hub 51 should it be so desired. Also the collar 22 may be grooved at 58 to receive a compression spring 59, which spring is adapted to rest on the hub and when the nut 35 is loosened to raise the hub and free the pin 54 from the plate 50. 60 is an annular shoulder formed on the collar 22 which is adapted to receive the ring 21 (Fig. 1), the depth of the shoulder being greater than the thickness of the ring, so that clamping the nut against the collar will not clamp the ring. 62 is an agitator the lower end of which surrounds the threaded portion 33 of the shaft and rests on the top of the collar 22 and the squared portion 33 of the shaft being clamped thereagainst by the nut 35.

The plate 50 has formed therethrough a series of concentric rows or races of holes, the holes of each race being of a different diameter from those of any other race, and being usually adapted to receive each a single grain of some particular kind of seed. The largest holes for the larger grains are usually placed nearest the periphery of the plate, and the coning of the underlying disk permits greatest depth for such holes where these largest holes occur.

In Fig. 4, A, B, C, D, E and F, indicate six such concentric races. The three outer of these races A, B and C are designed each to give three spacings of a desired size of seed, namely, four spacings, three spacings and two spacings. To accomplish this the holes in race A are in three groups, namely, four equally spaced holes, three equally spaced holes and two equally spaced holes. However two of the four holes may be used for the "two" group, and one of the four holes for the "three" group, so that there are shown in race A, four holes, 70, 71, 72 and 73, which are equally spaced and form the "four" group and two additional holes 74 and 75 which are equally spaced from each other and from hole 70 and comprise the "three" group. The hole 71 and the diametrically opposite hole 73 form also the "two" group. Races B and C are identical with race A except that the holes are of smaller size. These holes however are of greater radius than the race spacings and if the holes of races A and B, or B and C were radially aligned, would cut into each other. The holes in these races however have no necessary relation with those of any other race and those of race B have been circumferentially shifted some 45 degrees from those of race A. The holes of race C for convenience have been aligned with race A.

Race D has a "four" group, comprising four equally spaced holes 76, 77, 78 and 79, here shown radially aligned with the holes of the "four" group of race A, and a "six" group comprising the holes 76 and 78 of the "four" group and additional holes 80, 81, 82 and 83.

Race E has a "six" group, comprising the holes 84, 85, 86, 87, 88 and 89, and an "eight" group comprising the holes 84 and 87 of the "six" group, and additional holes 90, 91, 92, 93, 94 and 95.

Race F has ten equally spaced holes, generally designated by the number 96.

Since there are six groups of hole spacings in plate 50, six lock holes 55 are provided in the ring 51. The lock hole for the "two" group of the races A, B and C is indicated on the plate 50 by the number 2 stamped on the surface of the plate adjacent the outside of the collar 22, and the lock holes for the "three" group, the "four" group, the "six" group, the "eight" group and the "ten" group are marked 3, 4, 6, 8 and 10 in similar manner.

100 is a mark or pointer which is on the collar 22 in line with the pin 54, if the numbers 2, 3, etc., are alongside the lock-holes to which they refer. This mark preferably extends down the exterior of the collar in such manner as to be registrable with any one of these numbers. The disk 43 has an identical number of races underlying and being coincidental with the plate races. On each race there are an identical number of groups of holes, which groups are in themselves each identical with a group of the overlying plate, the groups of the disk have a different spacing relative to each other from the group spacings of the plate, in order that in any race only one plate group may be in register with a disk group. It will be understood however, that while six holes were sufficient to form the groups of race A of the plate, eight holes were necessary in the disk to accomplish such out of register spacing.

To make the disk 43 to cooperate with the plate 50 or to make a template or pattern for making such disks, the disk blank is placed on squared shank 33 of the shaft, the plate 50 is placed on the disk and the collar 22 put in place, but with the pin 54 disengaged. The plate is turned until the pointer 100 on the collar registers with one of the numbers 2, 3, 4, etc., stamped on the plate, for example the number 4. The collar is then lowered and the plate clamped to the disk with the pin 54 in the lock hole 4. In such position (shown in Fig. 4), all of the "four" holes in the plate these being the holes 70, 71, 72 and 73 of race A, the corresponding holes of races B and C and the holes 76, 77, 78 and 79, of race D are drilled in the underlying disk. In Fig. 4 in order to identify these underlying holes, they are shown dotted and larger than the holes in the plate; for example the underlying hole in the disk corresponding to the hole 70 in the plate is numbered 70A, the other underlying holes are similarly shown, but not numbered. Having drilled all of the "four" holes in the disk, the collar is loosened and the plate shifted to bring the pointer 100 in alignment with some other lock hole such as the lock hole 2 and is again clamped, and the "two" holes in the plate 50, being the holes 71 and 73 of the A race and the corresponding holes of the B and C races, are drilled in the underlying disk. The collar is then again loosened and the operation repeated for each of the remaining lock holes. It will be noted that the holes 71 and 74 and the holes 73 and 75 of race A are thirty degrees apart and that when the "four" holes 70, 71, 72 and 73 have been made in the disk, a thirty or sixty degree shift either the hole 74 or the hole 75 to register with a disk hole 71 or 73. By spacing the lock hole "3" sixty degrees from the lock hole "4", this is taken advantage of and only two additional holes need be made to complete the "3" hole disk. By positioning the lock hole 2 fifteen degrees from the lock hole "4" an entirely blank space is found in the disk, and this may be used for the two diametrically opposite "2" holes. These holes also might be marked and used for the six, eight and ten spacings, but I prefer to use a diametrically opposite set of three lock holes numbered 6, 8, and 10, the hole numbered 8 being seventeen and one-half degrees from the hole "6" to get the best distribution of spacing. Hole 10 may however, be positioned at random, but is ordinarily placed sixty degrees therefrom on the remote side of hole "6" from the hole "8". It will be understood however, that while the above is one way of making the disk from the plate, that it is entirely possible to make the plate 50 without any lock-holes, position the plate on the disk 43 at random and the collar 22 in place with the pin 54 removed, then drill all the "four" holes in the disk and the "4" lock hole through the pin hole in the collar; shift the plate relatively to the disk, drill the "three" holes and the "3" lock hole, and shift the plate and proceed as before.

The slides 38 and 40 underlie diametrically opposite sides of the disk 43 and are each radially slidable. Slide 38 has a rectangular opening 101, the width of the opening being equal to the diameter of the largest holes 70, etc., in the plate and disk, and its length transverse to the slide considerably greater. Slide 40 has a similar though smaller opening 102; 103 and 104 are openings in the base 36, which underlies the opening 101, 102 in the slides. One slide only may be used and if so the base opening 103 extends from the outside of the holes of race A to the inside of the holes of race F. As here shown however, the base opening 102 underlies only the races A, B and C and the base opening 103 the races D, E, F. 105 is a trash discharge opening. Dust and/or trash openings 106, 107 are also provided in a side edge of the slide 38, and similar openings may be provided in the slide 40. Each of these slides may be provided with an upwardly turned ear as the ear 108 of slide 38 to facilitate shifting. 109 is a slot in the slide 38, this slot preferably having notches 110, there being one such notch for each race A, B, C and the spacing of the notches conforming to the spacings of the races. 111 is a bolt adapted to engage in any one of these notches, the bolt having a thumb nut 112 for clamping the slide when the bolt is so engaged. The lower end of the bolt preferably being hingedly secured to the underlying base extension 41, as by a pin 113, where by thumb nut 112 may be loosened and the bolt swung as to dotted position 111A (Fig. 5) to permit shifting of the slide. Each notch may be directly marked as by the word "corn" shown to designate the seed to be planted. Slide 40 is preferably similarly constructed and held.

Preferably a bracket 115 is secured to the slide 38 as by the rivets 116. Secured to this bracket is an arm 117 which extends inward through the walls of the hopper 10 and sleeve 13, with its inner end above the opening 101 in the slide. Secured to the arm 117 and in alignment with the opening is a device, popularly known as a "knocker", which may be of any of a number of well known types. As shown this "knocker" comprises a slotted member 118 clamped to the arm 117 by thumb screw 119. A ring 120 (Fig. 2), is supported in this member by a pin 121, the ring being downwardly urged by a compression spring 122 and by this spring caused to thump into each of the openings, as the hole 72 in the plate 50, as such openings pass thereunder. Since the knocker is carried by the slide it will at all times be in register with the particular race of holes being used. 123 is an usual type of brush or wiper carried by the knocker for dislodging excess seed from the seed openings. A similar knocker bracket may be used with the opposite slide 40, but instead a knocker 125 may be adjustably mounted as on one of the arms 20 used to center the holder, and be positioned and clamped by the screw 126 where desired.

The arm 117 may pass through a slot in the hopper wall 10 and a slot in the sleeve 13, but would necessarily have to be removed to permit removal or adjustment of either. I prefer therefore, to notch the walls of both as shown at 127 and 128 in Fig. 3, so that they will fit down over the arm 117. The open space so left is closed by a wall portion 130 having ears 131 which are secured to the base extension 41 as by screws 132.

A support 133 for the arm 117 may extend inward and sides 134 and end 135 may depend from this support to form a box shaped support, the sides 134 being available to close off the slot in the flange 15.

If the planter is to be used to plant cotton also, the plate 50 is made larger than the underlying disk 43 and the projecting portion is notched to form spaces for cotton seed to drop through, which spaces are separated by slender fingers 150 preferably radial. These fingers and spaces overlie an annular portion of the base 11 adjacent the hopper 10 and separated from the disk by an annular rib 151. The base, between this rib and the hopper has an opening 152 therethrough, which opening, to avoid interference with the slide 38 is angularly off-set therefrom.

Projecting upward through this opening, and into engagement with the fingers 150 of the plate, are the teeth 153 of a picker wheel 154 which is carried by a radially disposed shaft 155, the shaft being supported by brackets 156 depending from the boss. 157 are prongs on the wheel. The wheel 154 which, as shown, is of an usual and well known type, may be journaled on the shaft, but I prefer to journal the shaft in the brackets, to secure the wheel to the shaft as by a set screw 158, and to secure on the outer end of the shaft a knob 159 by which the shaft may be turned and the plate 50, may be adjusted relative to the disk 43. 160 is a slide and 161 a clamp screw therefor, the slide being adjustable inward or outward to regulate discharge through the opening 152.

In Figs. 8 and 9 a modification is shown in which a plate 50A and slides 38 and 40 are used without an interposed disk. 11A is a base, which at diametrically opposite edges supports a bridge 200. 201 is a hub carried by the bridge and 202 a shaft journaled in and depending from the hub, this shaft having an enlarged collar 203, on its lower end, by which the plate 50A is supported. Rotation of the plate is here shown accomplished by the picker wheel 154A, this wheel being secured as by a key 204 on the shaft 155A, which is driven from a remote source not shown.

In this modification no change other than in thickness is made in the plate so far as the cotton planting feature is concerned. The holes in the plate are arranged as before in a plurality of races G, H, I, J, K, L, there being a separate race for each size and spacing of grain. In race G there are shown four holes 205 say five-eighths inch diameter; in race H, three holes 206, of the same diameter, and in race I, two holes 207 also of the same diameter. In rows J, K and L there are four holes 208, three holes 209, and two holes 310 respectively all one-half inch diameter, and in each subsequent race there is a desired number of a single size hole.

It will be understood that the shape and size of the holes in the plate and disk and the particular spacings selected are illustrative only, and that other numbers of races, sizes or holes, and spacing of holes in the races, may obviously be adopted.

It will be understood that the cotton seed feeding portion of the device may be dispensed with should it be so desired, in which case the plate 50 could be brought adjacent the wall of the hopper 10 and the sleeve 13 and its flanges be used or not as desired.

It will further be understood that the relative spacing of the three sizes of holes in races D, E and F in particular, could advantageously be changed from those shown where planting through these holes is done at the same time, and in alternation with planting through the outer three races.

It will also be understood that the disk 43 has been coned in order that the holes therethrough be made deeper toward the outer edge where the seed to be planted is larger, but that obviously this disk can be of uniform thickness throughout should it be so desired.

It will further be understood that the holder 17 is an adjunct usable only where alternate planting is desirable, and that it may obviously be dispensed with without departing from the spirit of my invention, and that if used the inwardly and upwardly inclined flange at the top of the holder may be dispensed with, should it be so desired and that the method of supporting and bracing this hopper is introduced for purposes of illustration only.

It will be understood that the showing of a wider upper flange as well as a lower flange on the sleeve 13, in order that the sleeve may be inverted and one race of holes be covered is not inherently necessary.

It will be understood that the knocker 118 may be adjustable in conformity with the adjustment of the slide 38 but that it is not necessarily so, and that it may be supported and adjusted as is the knocker 125 should it be so desired.

In using the device for corn or other seed, the sleeve 13 is lowered into place as shown in Fig. 1 and clamped by the set screws 14, with the flange 15 overlying the fingers 150, the holder 17 ordinarily not being used. The nut 35 is loosened and the collar 22 raised, disengaging the pin 54 from the holes in the disk 43 and the plate 50. The plate is then turned until the number stamped on the plate as for instance, the number 4, designating four seed spacings per plate revolution, is opposite the mark 100 (and in this instance the pin 54) of the collar 22. This turning of the plate may be accomplished by turning the knob 159 and through the picker 154 rotating the plate. When the mark and desired number are in register, the collar is dropped, the pin 54 passing through the plate hole 55 then in register, and into the hole 56 in the disk, and the nut 35 is tightened to hold them locked in such position. The thumb nut 112 is loosened, the bolt 111 is shifted out of the notches in the slide 38 and the slide is adjusted inward or outward until the size, or seed marking is shown opposite the bolt. The bolt is then swung into the corresponding one of the notches 110 and the thumb nut 112 is tightened to hold the slide in place. This shifting of the slide brings the opening 101 therein beneath the desired race of holes in the plate, and the knocker 118 thereabove. When so set the hopper is filled with the desired seed and planting begun.

In Fig. 4 the pin 54 is shown in register with the number 4 on the plate. The slide 38 is shown with the opening 101 therein beneath the hole 72 which is one of the holes in the race A. The plate is therefore set for dropping four grains per revolution of the size corresponding to the holes 70, 71, 72 and 73. It will be remembered that in this race there are two additional holes 74 and 75 through the plate 50, but these two holes are closed by the underlying disk 43 which at this setting is solid at these points. The holes 70, 71, 72 and 73 will be filled and the grain carried around as the plate and disk are turned by the gears 28, 30. The underlying base 11 closes these holes except at such time as any one of them comes in register with the opening 101 in the slide 38. The slide 40 has an opening 102 therethrough but since the holes with which this opening registers are smaller than the seed being dropped through the opening in the slide 38, seed feeding through such slide cannot occur irrespective of its positioning. On the other hand, if it should be desired to use the slide 40 with the smaller races of holes, the slide 38 must be shifted to close all the larger holes so that no opening occurs under these larger races. The slide 40 may obviously be used in similar manner as just described for the slide 38.

Should it be desired to alternate two types of seed the holder 17 is placed as shown in Fig. 1, and the slides set as desired for their respective seeds. The annular space between the holder and sleeve 13 is filled with the larger seed and the interior of the holder 17 with the smaller seed.

As the disk and plate are revolved, seed will be dropped alternately through the hole in the slide 38 and the diametrically opposite hole in the slide 40. In both cases as the plate revolves the brush 123 sweeps off excess seed that may attempt to pile up above that which the hole being used can accommodate. As the hole comes under the knocker 118, spring 122 urges the ring 120 downward and knocks the seed through the hole. It will be understood that this brush and knocker are well known in the art and that no claim is made for the particular detail thereof set forth.

In the above described uses, it will be noted that the sleeve 13 is fully nested within the hopper 10 and that the flange 15 of this sleeve extends inward adjacent the outer race A of holes, thus covering and blanking off all portions of the plate 50 exterior to the outer row of holes. Should it be desired to plant cotton, the slides 38 are shifted to cut off all the larger holes in the plate, and, though not necessary, the slide 40 may also be shifted to cut off some or all of the smaller holes. The thumb nuts 14 are loosened and the sleeve 13 raised to the dotted position 13A of Fig. 1, the flange 15 at that time occupying the dotted position 15A, these being the positions of the sleeve and slide shown in Fig. 7. With the sleeve thus raised the capacity of the hopper is largely increased which is extremely advantageous in cotton planting. At the same time the picker wheel 154 is exposed as is the opening 152 in which it works. The slide 160 is adjusted in or out as the case may be to regulate the size of this opening. As the plate 50 is turned the teeth 153 of the picker wheel are turned by the fingers 150 of the plate and the cotton so stirred that it drops through the opening and is engaged by the prongs 157 of the picker wheel and is distributed thereby.

It will be noted that the knocker and its supporting bracket and arm project into the hopper directly behind the opening 152 and the picker mechanism therein. This projection is advantageous in that it prevents rotation of the entire mass of cotton by the plate which in some instances has proved undesirable.

In using the form of the device shown in Figs. 8 and 9, it is only necessary to adjust the slide 38 to the desired race, fill the hopper and proceed. Action of the cotton race is identical with that above described.

What I claim is:

1. A seed distributing mechanism, including a pair of superposed races, having each a plurality of holes therethrough arranged along conforming circles in groups, said groups of one race being complementary to those of the other race but arranged in said races in dissimilar relative positions, and means for registering any desired group of one said race with a complementary group of the other said race and securing them in such position.

2. A seed distributing mechanism, including a pair of superposed members, having each a plurality of holes therethrough arranged along a plurality of pairs of conforming circles in at least three complementary groups, said groups of one circle of each conforming pair being arranged in dissimilar relative position to those of the other circle of said pair, and means for registering any desired group of one said member with a complementary group of the other said member and securing said members together in such position.

3. In a seed distributing mechanism, a plate and a cooperating disk, each having a row of holes arranged in a circle, said circles conforming, the holes of said plate and disk being arranged in complementary groups, but the groups of said disk and said plate being arranged in dissimilar relative positions in their respective circles, and means for securing any desired group of said plate and disk in register.

4. In a seed distributing mechanism a plate and a cooperaitng disk, each carrying a plurality of complementary races of holes, each said race having a row of holes arranged in a circle, said circles conforming, the holes of said plate and disk being arranged in complementary groups but the groups of said disk and said plate being arranged in dissimilar relative positions in their respective circles, and means for securing any desired group of said plate and said disk in register.

5. In a seed discharge mechanism, a plate having rows of holes therethrough concentric with its center, said holes being arranged in at least three groups, the holes of any one said group being equally spaced around said circle and differing in number from the other groups of its said row, a disk cooperating with said plate and having similar rows and complementary groups of holes therethrough, the groups of said disk being dissimilarly arranged in their said rows relatively to each other, and means for selectively positioning and securing said plate and disk together with any desired complementary groups of said plate and disk in register.

6. In a seed discharge mechanism, a plate having rows of holes therethrough, concentric with its center, said holes being arranged in groups, the holes of a said group being equally spaced and differing in number from the other groups of its said row, a disk cooperating with said plate and having similar rows and complementary groups of holes therethrough, the groups of said disk being dissimilarly arranged in their said rows relatively to each other, means for selectively positioning and securing said plate and disk together with desired complementary groups of said plate and disk in register, and means underlying said disk for selectively rendering a desired row of said holes operative.

7. In a seed distributor a circular disk, a circular plate overlying said disk, said plate and disk having a common center and being relatively shiftable thereabout said plate having a plurality of concentric races of holes therethrough arranged in groups, and said disk having coincident races of holes therethrough arranged in similar groups, the groups of any said race of said disk being relatively dissimilarly spaced from the relative spacing of the same group of the coincident race of said plate, means for determining register of a plate group and a similar disk group of holes, and means for securing said plate and disk together.

8. In a seed distributor a hopper having a circumferential wall and a base, and a seed distributing plate rotatably mounted above and adjacent said base, a sleeve within said hopper and adjacent said wall, said sleeve being vertically adjustable along said wall, so as to increase the height thereof, and having adjacent its lower end an inwardly extending annular flange adapted to overlie and blank off a peripheral portion of said plate, said flange being moveable with said sleeve away from said plate to uncover said peripheral portions for use.

9. In a seed distributor, a shaft and driving means therefor, a disk mounted on said shaft and rotated thereby, a plate mounted on said disk and rotatable with respect thereto, said plate and said disk each having groups of holes, certain group of said plate being registrable respectively with related respective groups of said disk to establish openings through said plate and disk, indicia marked on said plate designating respectively said plate groups, a collar carried by and slidable along said shaft and rotatable therewith and with said disk, means carried by said collar alignable with said plate indicia to indicate register between said plate group designated by said indicia and a similar group on said disk, and means carried by said collar for locking said plate to said disk in such position.

10. In a seed distributor, a shaft and driving means therefor, a disk mounted on said shaft, means for rotating said disk, a plate mounted on said disk and rotatable with respect thereto, said plate and said disk each having groups of holes, certain groups of said plate being registrable respectively with related respective groups of said disk to establish openings through said plate and disk, indicia marked on said plate designating respectively each of said plate groups, means rotatable with said disk alignable with said plate indicia to indicate register between said plate group designated by said indicia and a similar group on said disk, and means for locking said plate to said disk in such position.

11. In a seed distributor, a substantially horizontal base, a substantially vertical shaft journaled in said base and extending thereabove, a disk carried by said shaft, means for rotating said disk, said disk having a plurality of holes arranged in races concentric with said shaft, the holes of each said race being arranged in groups, a plate carried by said disk and shiftable therearound, said plate having a similar number of conforming races of holes, arranged in complementary groups, with the related groups of said disk, but dissimilarly spaced in their respective races, means for locking said plate and said disk together with any desired said group of holes in register; said base having a substantially radial opening therethrough, and a slide adjustably carried in and adapted to close said opening, said slide having an opening therethrough adapted to underlie only one said race at a time.

12. In a seed distributor a substantially horizontal base, a substantially vertical shaft journaled in said base and extending thereabove, a disk carried by said shaft and rotatable thereby, said disk having a plurality of holes arranged in races concentric with said shaft, the holes of each said race being arranged in groups, a plate carried by said disk and shiftable therearound, said plate having a similar number of conforming races of holes, arranged in complementary groups with the related groups of said disk, but dissimilarly spaced in their respective races, means for locking said plate and said disk together with any desired said group of holes in register; said base having a substantially radial opening therethrough, and a slide adjustably carried in and adapted to close said opening, said slide having an opening therethrough adapted to underlie only one said race at a time.

13. In a seed distributor a substantially horizontal base, a substantially vertical shaft journaled in said base, a disk carried by said shaft, means for rotating said disk, said disk having a plurality of holes arranged in races concentric with said shaft, the holes of each said race being arranged in groups, a plate carried by said disk and shiftable therearound, said plate having a similar number of conforming races of holes, arranged in complementary groups with the related groups of said disk, but dissimilarly spaced in their respective races, means for indicating register of a desired groups of holes, means for locking said plate and said disk together, said base having a substantially radial opening therethrough, and a slide adjustably carried in and adapted to close said opening, said slide having an opening therethrough adapted to underlie only one said race at a time.

14. In a seed distributor, a hopper having a substantially horizontal base, a sleeve disposed in said hopper and having at its lower end an annular flange, said sleeve being vertically adjustable to raise said flange, a substantially vertical shaft journaled in said base and extending thereabove, a disk carried by said shaft and rotatable thereby, said disk having a plurality of holes arranged in races concentric with said shaft, the holes of each said race being arranged in groups, a plate carried by said disk and shiftable therearound, said plate having a similar number of conforming races of holes, arranged in complementary groups with the related groups of said disk, but dissimilarly spaced in their respective races, means for locking said plate and said disk together with any desired said group of holes in register; said base having a substantially radial opening therethrough, and a slide adjustably carried in and adapted to close said opening, said slide having an opening therethrough adapted to underlie only one said race at a time, and said sleeve flange being adapted to cover or uncover an outer race of said plate.

15. A seed distributor, including a circular rotatable member having a plurality of projecting finger-like processes spaced around its periphery, and a concentric row of holes spaced inwardly therefrom, a base disposed beneath said member, said base having a first and a second opening therethrough, respectively underlying said finger-like processes and said holes, a cylindrical wall carried by said base and extending thereabove, said base and wall forming a hopper, a sleeve within said hopper and adjacent said wall, said sleeve being vertically adjustable along said wall to increase the height thereof and having means at its lower end, adapted when lowered to cover and block off said finger-like processes, means for securing said sleeve in raised or lowered position, and means for closing said second base opening.

16. A seed distributing mechanism, including a pair of superimposed races having each a plurality of holes therethrough arranged along conforming circles and in groups in each circle, said groups of each race being complementary to those of the other race but arranged in the respective races in dis-similar relative positions, one race being rotatable to a plurality of positions relative to the other to effect registration of different groups of holes in one race with holes of the other race, and means to positively determine each of said plurality of positions of the races.

17. A seed distributing mechanism, including a pair of superimposed races having each a plurality of holes therethrough arranged along conforming circles and in groups in each circle, said groups of each race being complementary to those of the other race but arranged in the respective races in dis-similar relative positions, one race being rotatable to a plurality of positions relative to the other to effect registration of different groups of holes in one race with holes of the other race, and means to positively determine each of said plurality of positions of the races and to secure them in each said determined position.

18. A seed distributing mechanism, including a pair of superimposed members having each a plurality of holes therethrough arranged along a plurality of pairs of conforming circles in complementary groups, said groups of one circle of each conforming pair being arranged in dissimilar relative positions to those of the other circle of said pair, one member being rotatable to a plurality of positions relative to the other to effect registration of different groups of holes in either of said circles with holes of the other circle of the pair, and means to positively determine each of said plurality of positions.

19. A seed distributing mechanism, including a pair of superimposed members having each a plurality of holes therethrough arranged along a plurality of pairs of conforming circles in complementary groups, said groups of one circle of each conforming pair being arranged in dis-similar relative positions to those of the other circle of said pair, one member being rotatable to a plurality of positions relative to the other to effect registration of different groups of holes in either of said circles with holes of the other circle of the pair, and means to positively determine each of said plurality of positions and to secure them in said positions.

20. A seed distributing mechanism, including a pair of superimposed members having each a plurality of holes therethrough arranged along a plurality of pairs of conforming circles in complementary groups, said groups of one circle of each conforming pair being arranged in dissimilar relative positions to those of the other circle of said pair, one member being rotatable to a plurality of positions relative to the other to effect registration of different groups of holes in either of said circles with holes of the other circle of the pair, means to indicate each of said plurality of positions, means to positively determine each of said positions and to secure the members in said positions.

ROBERT MANN.